(12) United States Patent
Takaki et al.

(10) Patent No.: US 7,236,444 B2
(45) Date of Patent: Jun. 26, 2007

(54) WAVEFRONT ABERRATION CORRECTING DEVICE AND OPTICAL PICKUP EQUIPPED WITH THE SAME

(75) Inventors: Yasuhiro Takaki, Koganei (JP); Ei-ichiro Nishihara, Koganei (JP); Nobuyuki Hashimoto, Tokorozawa (JP)

(73) Assignee: Tokyo University of Agriculture and Technology TLO Co., Ltd., Tokyo (JP)

( * ) Notice: Subject to any disclaimer, the term of this patent is extended or adjusted under 35 U.S.C. 154(b) by 4 days.

(21) Appl. No.: 10/527,053

(22) PCT Filed: Mar. 10, 2004

(86) PCT No.: PCT/JP2004/003100

§ 371 (c)(1),
(2), (4) Date: Mar. 9, 2005

(87) PCT Pub. No.: WO2004/086389

PCT Pub. Date: Oct. 7, 2004

(65) Prior Publication Data

US 2005/0237897 A1    Oct. 27, 2005

(30) Foreign Application Priority Data

Mar. 27, 2003   (JP) .............................. 2003-087676

(51) Int. Cl.
*G11B 7/00* (2006.01)
(52) U.S. Cl. ................................. 369/112.02
(58) Field of Classification Search ........... 369/112.02, 369/44.32
See application file for complete search history.

(56) References Cited

U.S. PATENT DOCUMENTS 4,729,640 A * 3/1988 Sakata ........................ 349/201

(Continued)

FOREIGN PATENT DOCUMENTS

| JP | 06-273718 | 9/1994 |
|----|-----------|--------|
| JP | 06-281909 | 10/1994 |
| JP | 2002-208158 | 7/2002 |
| JP | 2002-251774 | 9/2002 |
| JP | 2003-006914 | 1/2003 |
| JP | 2003-036555 | 2/2003 |
| JP | 2003-067966 | 3/2003 |

OTHER PUBLICATIONS

Motegi, Y., et al., High-density Optical Disc and Countermeasure Technology for Disc Tilt, (The Journal of the Japan Society of Mechanical Engineers), Apr. 2001 vol. 104, No. 989, p. 241.

*Primary Examiner*—Wayne Young
*Assistant Examiner*—LaTanya Bibbins
(74) *Attorney, Agent, or Firm*—Morgan, Lewis & Bockius LLP

(57) ABSTRACT

An object of the present invention is to provide a wavefront aberration correcting device comprising a liquid crystal device that maximizes transmittance and minimizes light transmittance fluctuations even when the liquid crystal is driven by voltage. Disclosed is a wavefront aberration correcting device for correcting a wavefront aberration of light generated in an optical path of an optical system for irradiating light onto a recording medium or guiding the reflected light reflected by the abovementioned recording medium is characterized in that it comprises a pair of opposing transparent electrode layers provided in the abovementioned optical path; and a liquid crystal sandwiched between the abovementioned transparent electrode layers, for generating phase change in passing light due to voltage applied to the abovementioned transparent electrode layers, the abovementioned transparent electrode layer is arranged on an antireflective body comprising a substrate, and a finestructure formed on a substrate and having a concave-convex structure.

20 Claims, 16 Drawing Sheets

U.S. PATENT DOCUMENTS

| | | |
|---|---|---|
| 5,276,745 A * | 1/1994 | Revelli, Jr. .................. 385/14 |
| 5,481,530 A * | 1/1996 | Ueda et al. .............. 369/275.1 |
| 5,754,260 A * | 5/1998 | Ooi et al. ..................... 349/10 |
| 6,014,197 A * | 1/2000 | Hikmet ....................... 349/201 |
| 6,078,554 A * | 6/2000 | Ootaki et al. .......... 369/112.02 |
| 6,215,538 B1 * | 4/2001 | Narutaki et al. ............ 349/106 |
| 6,532,202 B1 * | 3/2003 | Wada et al. ........... 369/112.02 |
| 6,552,990 B1 * | 4/2003 | Kajiyama et al. ...... 369/112.06 |
| 6,580,674 B1 * | 6/2003 | Nishiyama et al. .... 369/112.01 |
| 6,624,860 B1 * | 9/2003 | Narutaki et al. ............ 349/106 |
| 6,628,599 B2 * | 9/2003 | Maeda et al. .......... 369/112.01 |
| 6,892,181 B1 * | 5/2005 | Megiddo et al. .............. 705/14 |
| 6,906,765 B2 * | 6/2005 | Narutaki et al. ............ 349/106 |
| 2005/0030880 A1* | 2/2005 | Kitaoka et al. ........ 369/112.29 |

* cited by examiner

FIG. 7
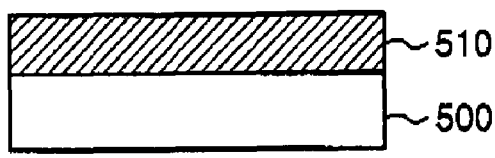
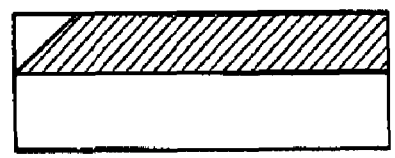
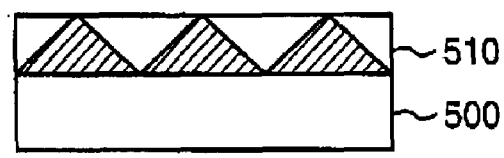
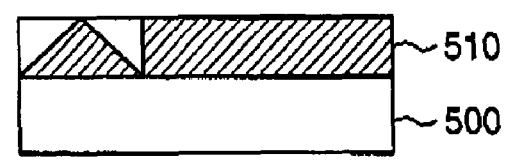
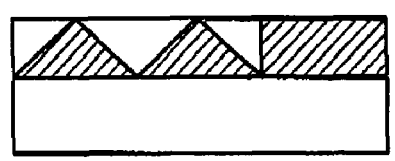
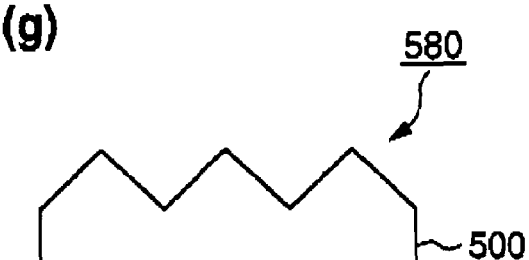

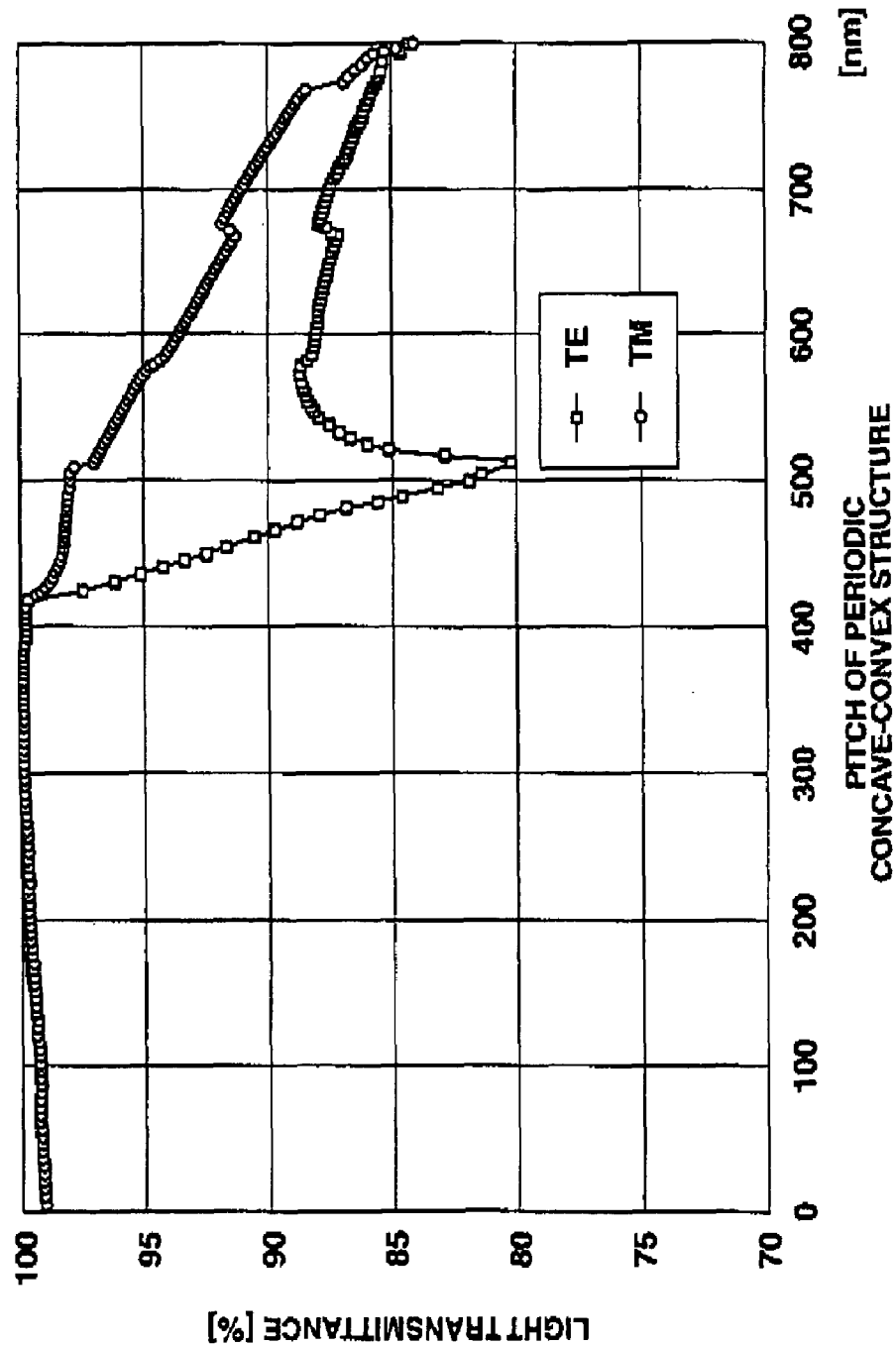

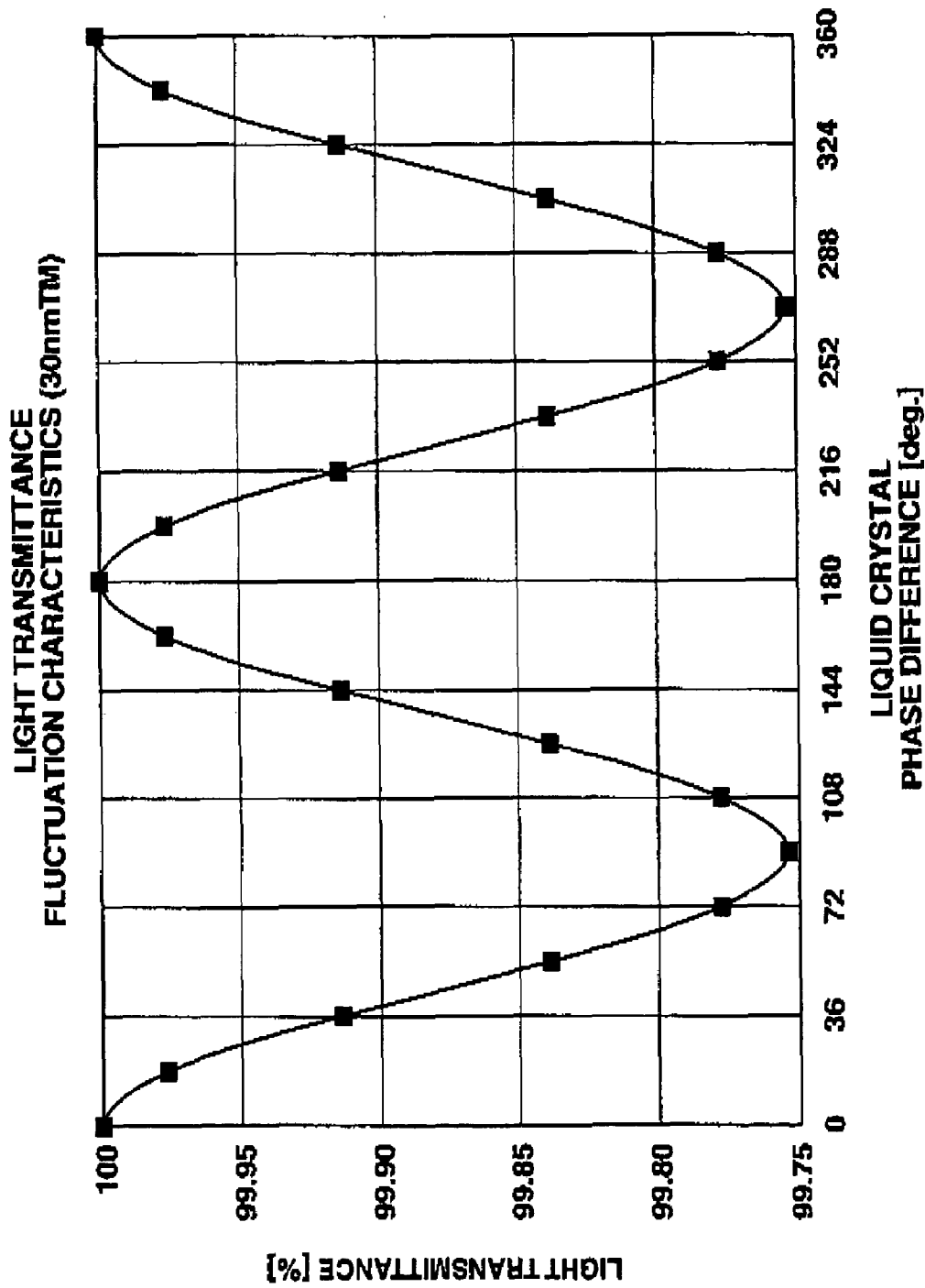

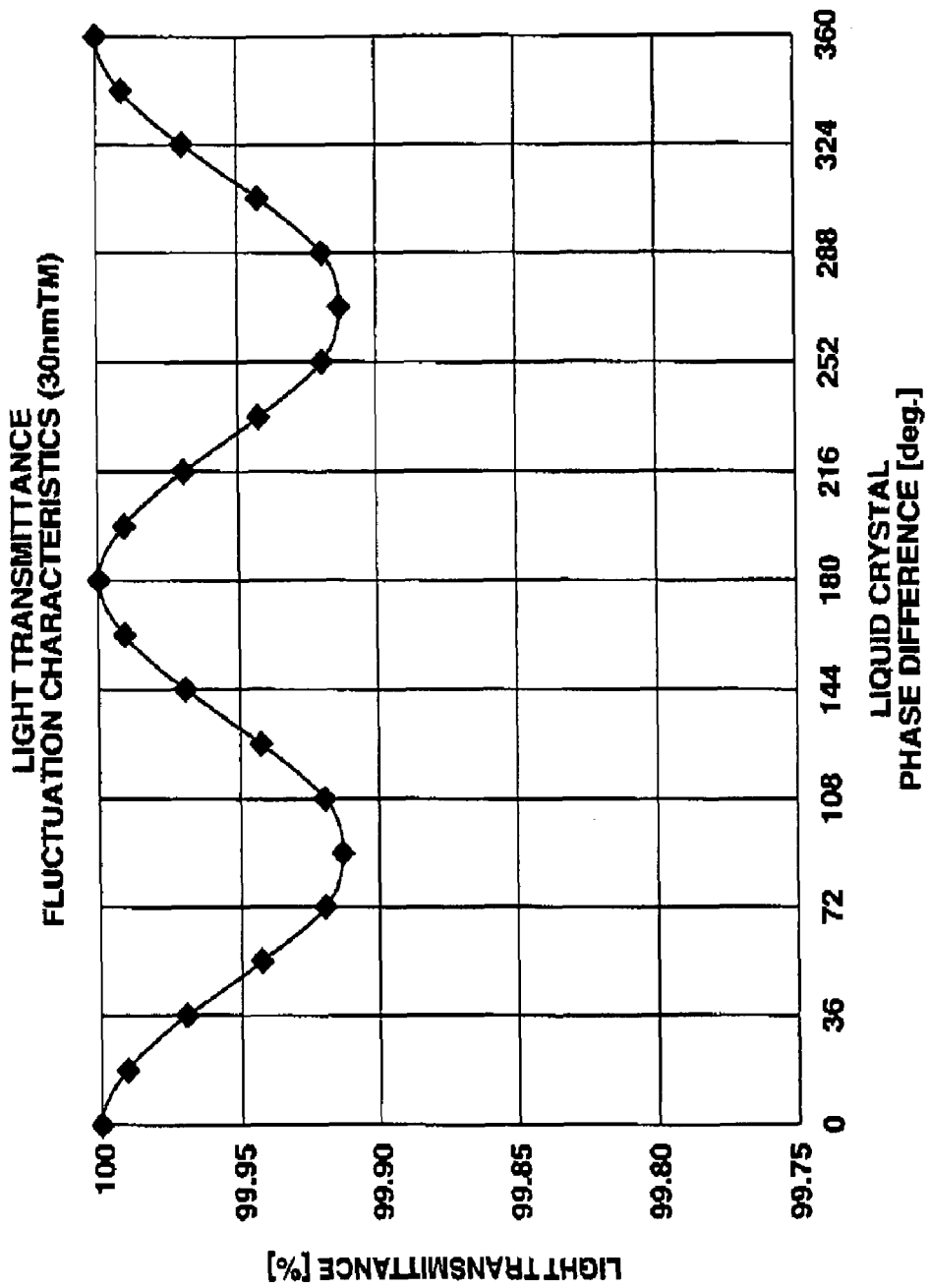

WAVEFRONT ABERRATION CORRECTING DEVICE AND OPTICAL PICKUP EQUIPPED WITH THE SAME

TECHNICAL FIELD

The present invention relates to an optical pickup device for the reading and writing of information on an optical disc, and more particularly relates to a wavefront aberration correcting device in which a liquid crystal is utilized, and an optical pickup device comprising this wavefront aberration correcting device,

BACKGROUND ART

It is well-known that information recording mediums for optical information recording or information reading include optical discs such as CD (compact disc) and DVD (digital versatile disc). A various optical discs such as read-only optical discs, recordable optical discs in which the post recording of information is possible, and rewritable optical discs on which the deleting and re-recording of information is possible have been developed.

Research and development into optical pickup devices and information recording and reading devices has proceeded alongside the high density and increased capacity of these optical discs (for example, see non-patent document 1). As a means for contending with optical discs of high density as described above, the irradiation of a light beam of small irradiation diameter on the optical disc by increasing the numerical aperture (hereinafter referred to as "NA") of an objective lens provided in the optical pickup device has been considered. As an additional means to contend with this increased densification, utilization of a short-wavelength light beam, or more particularly a light beam produced by a blue semiconductor laser, has been examined.

However, there is a problem inherent to the increasing of the NA of the objective lens and the utilization of the short-wavelength light beam in that there is an accompanying increase in the influence of aberration on the light beam produced by the optical disc and, accordingly, the improvement of information recording and information reading accuracy becomes difficult.

More specifically, if the optical disc tilts during the process of information recording or information reading and the incident angle of the light tilts with respect to the normal direction of the optical disc (so called tilt angle), the comma aberration effect increases, In addition, although the extent of aberration changes depending on a thickness of the optical disc substrate, there are problems inherent to the reading of a CD using an optical pickup device for the reading of a DVD in which the optical disc thickness of the CD is greater than that of the DVD in that this results in the generation of spherical aberration and a significant expansion of the spot diameter of the light.

On the other hand, in high-density optical discs such as DVD that have been developed in recent years, much attention has focused on the use of a liquid crystal device as an aberration correcting element of the optical system. The liquid crystal element, which is inserted into the optical path of an optical pickup comprising a laser light source and an objective lens, corrects the phase turbulence, that is to say, the light wavefront turbulence that is caused by comma aberration that has its origin in the tilting of the optical disc substrate and by the wavefront aberration generated when a multilayer disc substrate is read. This constitutes a method in which the phase is controlled by changing of the voltage applied to the liquid crystal.

By way of example of an liquid crystal device, as shown in FIG. 1, a liquid crystal device for modulating the phase of a monochromatic light or a laser light has been disclosed in which a pair of opposing transparent substrates on which an ITO layer which constitutes an oxide of indium and tin (hereinafter referred to simply as "ITO".) and an alignment film layer are laminated in sequence, a liquid crystal layer is provided between the alignment film layers, and an insulating film is formed between the alignment film layer and the ITO layer on at least one of the transparent substrates, and in which the relationship between the film thickness of the layers and the refractive indices thereof is optimized to minimize the light transmittance fluctuations of the liquid crystal device (for example, see patent document 1).

In addition, a liquid crystal device for correcting wavefront aberration generated in an optical system appropriately without effect of a ¼ wave plate arranged in the optical path that leads from a light source through a recording medium to a light detector has been disclosed (for example, see patent document 2). Although the technique disclosed for the liquid crystal device of patent document 2 involves the use of a curved liquid crystal substrate, this curved shape can in no way be regarded as contributing to improving the light transmittance.

[non-patent document 1] Journal of the Japan Society of Mechanical Engineers 2001.4 Vol, 104 No, 989

[patent document 1] Japanese Laid-Open Patent Publication No. 2002-208158

[patent document 2] Japanese Laid-Open Patent Publication No. 2002-251774

DISCLOSURE OF INVENTION

However, the liquid crystal device shown in FIG. 1 (1) comprises a multilayer thin-film structure and, in addition, the effective refractive index of the liquid crystal layer, which is a constituent element of the thin film, changes according to the drive of the liquid crystal. As a result, a problem of light transmittance fluctuation exists. This is because the characteristic of a resonator is produced due to the reflection at the interfaces between the films of the multilayer film. In particular, reflection from the interfaces with ITO films that have high refractive index is large and is surmised to be the main cause of light transmittance fluctuations.

In addition, in the liquid crystal element shown in FIG. 1, light transmittance fluctuations are suppressed by optimizing the refractive indices and the film thickness of the transparent electrode films or alignment film from which the element is constituted. However, (2) the optimum film thickness at the wavelength range of blue light (wavelength of the order of approximately 400 nm) is comparatively thicker than at the wavelength range of red light (wavelength of the order of approximately 650 nm) and, as a result, a problem of increased absorption loss arises.

In particular, the light transmittance in optical devices for laser optical systems in which that laser power is limited such as optical pickup devices is an essential element in the practical application of the optical pickup device. In the future, when the blue semiconductor laser is used as the light source to develop high-density recording, the problems with respect to the light transmittance fluctuation of the liquid crystal device will present a significant obstacle to the practical application thereof and, coupled with the development of the shorter wavelength light source, there is high likelihood that the problems outlined above will be further magnified.

Accordingly, there is a demand for, as a phase modulating device, a liquid crystal device of high light transmittance in which light transmittance fluctuations are reduced.

Therefore, and in view of the abovementioned problems of (1) and (2), a first object of the present invention is the provision of a wavefront aberration correcting device comprising a liquid crystal device that minimizes light transmittance fluctuations and that has a high light transmittance.

In addition, a second object of the present invention is the provision of an optical pickup device comprising the abovementioned wavefront aberration correcting device.

The first object is achieved by a wavefront aberration correcting device for correcting a wavefront aberration of light generated in an optical path of an optical system for irradiating light onto a recording medium or guiding reflected light reflected by the recording medium, the device comprising: a pair of opposing transparent electrode layers provided in the optical path; and a liquid crystal sandwiched between the transparent electrode layers, the liquid crystal generating phase change in passing light due to voltage applied to the transparent electrode layers, wherein at least one of the transparent layers is arranged on an antireflective body comprising a substrate, and a finestructure which is formed on the substrate and which has a concave-convex structure.

In the preferred aspect of the wavefront aberration correcting device according to the present invention, the concave-convex structure is formed in a one-dimensional and/or a two-dimensional shape.

In the preferred aspect of the wavefront aberration correcting device according to the present invention, when the concave-convex structure has a structure of changing periodically, a pitch of the concave-convex structure is no more than 500 nm.

In the preferred aspect of the wavefront aberration correcting device according to the present invention, the antireflective body comprises the substrate and the finestructure that are both formed from either a glass or a resin, and the substrate and the finestructure are integrally formed.

In the preferred aspect of the wavefront aberration correcting device according to the present invention, the antireflective body comprises the substrate formed from a glass and the finestructure formed from a resin.

In the preferred aspect of the wavefront aberration correcting device according to the present invention, the antireflective body comprises the substrate formed from a resin and the finestructure formed from a glass.

In the preferred aspect of the wavefront aberration correcting device according to the present invention, the wavefront aberration correcting device according to the present invention further comprises an alignment film provided between the transparent electrode layer and the liquid crystal.

In the preferred aspect of the wavefront aberration correcting device according to the present invention, the transparent electrode layer comprises an ITO layer that is an oxide of indium and tin.

In the preferred aspect of the wavefront aberration correcting device according to the present invention, the transparent electrode layer is partitioned into pixels.

In the preferred aspect of the wavefront aberration correcting device according to the present invention, the light is a blue semiconductor laser beam.

The second object is achieved by an optical pickup device comprising a light source that emits light for irradiation onto a recording medium, and an objective lens arranged between the light source and the recording medium, the objective lens converging the light from the light source onto an information recording surface of the recording medium, the optical pickup device comprising: a wavefront aberration correcting device arranged between the light source and the objective lens, the wavefront aberration correcting device comprising a pair of opposing transparent electrode layers provided in an optical path in the optical pickup device; and a liquid crystal sandwiched between the transparent electrode layers, the liquid crystal generating phase change in passing light due to voltage applied to the transparent electrode layers, wherein at least one of the transparent layer is arranged on an antireflective body comprising a substrate, and a finestructure which is formed on the substrate and which has a concave-convex structure.

In the preferred aspect of the optical pickup device according to the present invention, the concave-convex sturcture is formed in a one-dimensional and/or a two-dimensional shape.

In the preferred aspect of the optical pickup device according to the present invention, when the concave-convex structure has a structure of changing periodically, a pitch width of the concave-convex structure is no more than 500 nm.

In the preferred aspect of the optical pickup device according to the present invention, the antireflective body comprises the substrate and the finestructure that are both formed from either a glass or a resin, the substrate and the finestructure are integrally formed.

In the preferred aspect of the optical pickup device according to the present invention, the antireflective body comprise the substrate formed from a glass and the finestructure formed from a resin.

In the preferred aspect of the optical pickup device according to the present invention, the antireflective body comprises the substrate formed from a resin and the finestructure formed from a glass.

In the preferred aspect of the optical pickup device according to the present invention, the optical pickup device according to the present invention further comprises an alignment film provided between the transparent electrode layer and the liquid crystal.

In the preferred aspect of the optical pickup device according to the present invention, the transparent electrode layer comprises an ITO layer that is an oxide of indium and tin.

In the preferred aspect of the optical pickup device according to the present invention, the transparent electrode layer is partitioned into pixels.

In the preferred aspect of the optical pickup device according to the present invention, the light is a blue semiconductor laser beam.

It should be noted that, although the term "finestructure" used herein refers to a structural body in which a structure of nanometer (one hundred-millionth of one meter) level is provided on the surface thereof, the structure is in no way restricted to the nanometer level and the term encompasses structural bodies of a structure of a 1 μm level.

BRIEF DESCRIPTION OF DRAWINGS

FIG. 7 is a cross-sectional diagram of the steps for explaining another method for manufacturing the antireflective body according to the present invention. It should be noted that the arrows of FIGS. 7(b) and 7(c) indicate an irradiated electron beam whose dose amount is controlled;

FIG. 14 is a diagram illustrating the light transmittance simulation results of a liquid crystal device comprising the antireflective body according to the present invention, in which with an antireflective body surface of a periodic concave-convex structure, the depth of the periodic concave-convex structure was changed. It should be noted that this simulation was implemented using a light of wavelength 780 nm;

FIG. 15 is a diagram illustrating the light transmittance simulation results (TM) of the liquid crystal device comprising the antireflective body according to the present invention as a whole in which the phase of the liquid crystal layer was changed by an applied voltage; and FIG. 16 is a diagram showing the light transmittance simulation results (TE) of the liquid crystal device comprising the antireflective body according to the present invention as a whole in which the phase of the liquid crystal layer was changed by an applied voltage.

BEST MODE FOR CARRYING OUT THE INVENTION

A description is given below of an embodiment of the wavefront aberration correcting device according to the present invention and the optical pickup device comprising the same. It should be noted that although the embodiment described below represents a specifically suitable example of the present invention to which the preferred technical restrictions are imposed, there are no particular restrictions to the present invention in the description thereof, and the scope of the present invention should not be regarded as restricted to this mode.

Figure 1:
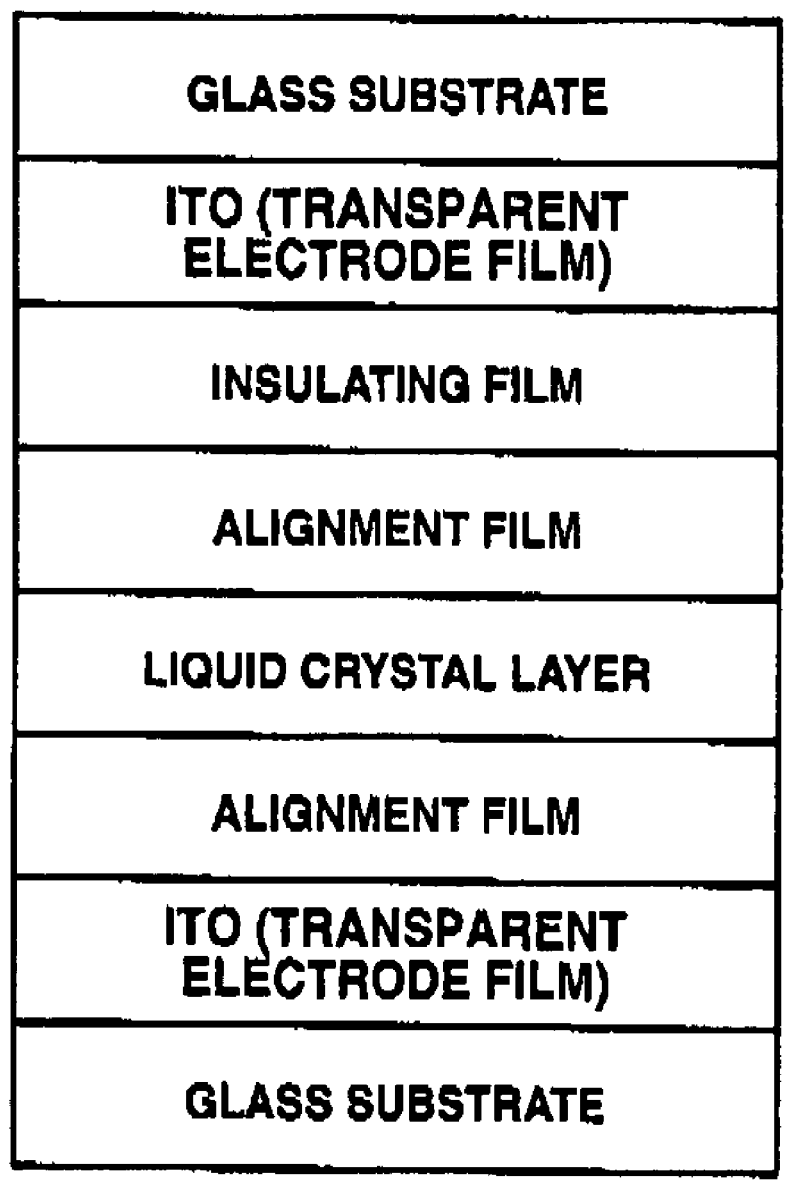
FIG. 1 is a view for explaining simply a liquid crystal device that serves as a phase modulating device in the prior art.
Figure 2:
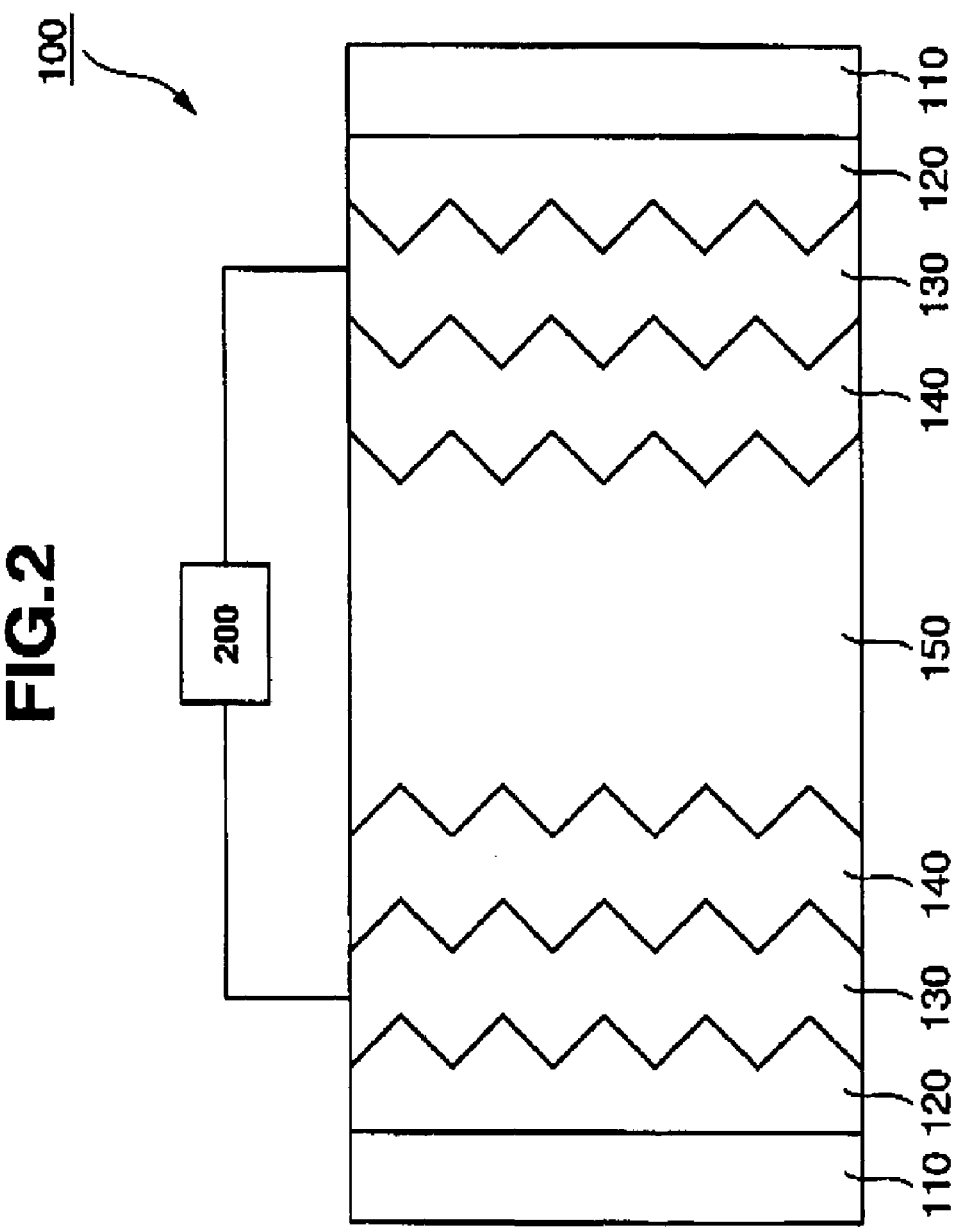
FIG. 2 is a schematic cross-section view for explaining simply the wavefront aberration correcting device according to the present invention.

FIG. 2 is a cross-section view of the constitution of a wavefront aberration correcting device 100 according to the present invention. As is shown in the view, a liquid crystal molecule is sealed in the wavefront aberration correcting device 100 by a pair of substrates 110 according to the present invention. The substrate material of the present invention may be the same as or different from the material of a later-described finestructure 120. Although there are no particular restrictions thereto, a glass and a transparent resin are specific examples of preferred substrate materials. Specific examples of the resin used include polymethyl methacrylate and polycarbonate.

Transparent electrode films 130 for the application of a voltage to the liquid crystal 150 by means of a liquid crystal drive device 200 are arranged on opposing surfaces of the substrates 110. Furthermore, alignment films 140 are formed on the inner side of the electrode films 130. Specific examples of the transparent electrode films 130 used in the present invention include a zinc oxide-based transparent electrode film, an indium oxide-zinc oxide-based transparent electrode film, and a tin-added indium oxide transparent electrode film. Considering light transmissivity, an ITO (hereinafter referred to simply as "ITO" layer), which constitutes an oxide of indium and tin, is preferred.

It should be noted that, although there are no particular restrictions to the liquid crystal molecule used in the present invention, as long as the liquid crystal molecule has an electrooptic effect by which the orientation thereof changes due to applied voltage generating phase changes in passing light, an homogenous-type liquid crystal or an homeotropic-type liquid crystal in which the crystals are aligned either in parallel or perpendicular to the substrate is preferred.

The ITO film 130 of the wavefront aberration correcting device 100 according to the present invention is arranged on a finestructure 120 on which a one-dimensional and/or a two-dimensional concave-convex structure is provided on the surface thereof.

Figure 3:
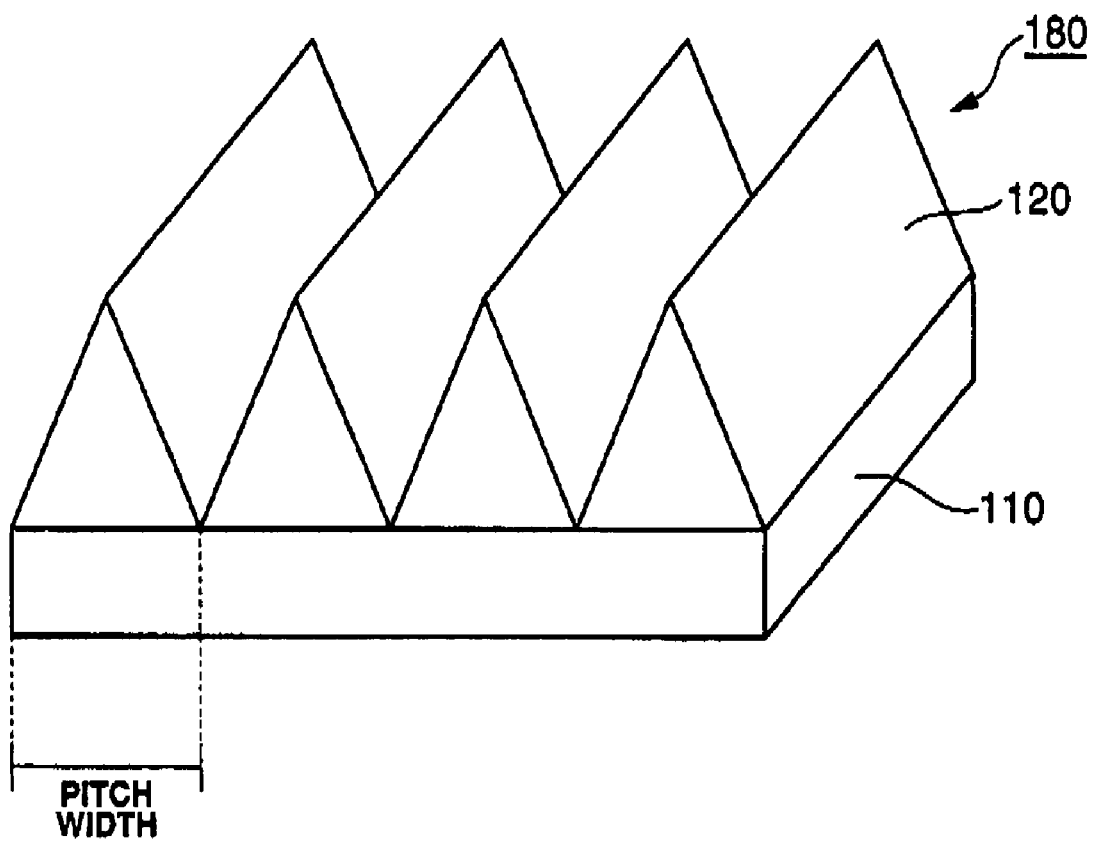
FIG. 3 is a perspective view of one embodiment of the shape of the finestructure according to the present invention.

FIG. 3 is a perspective view of one embodiment of the shape of the finestructure 120 according to the present invention. The finestructure 120, as is shown in FIG. 3, is formed on the substrate 110, and an antireflective body 180 comprises the substrate 110 and the finestructure 120. Although the substrate 110 and the finestructure 120 are illustrated separately in FIG. 3, if the substrate 110 and the finestructure 120 form from an identical material, an integrated antireflective body 180 may be formed. Although the shape of the finestructure 120 shown in FIG. 3 is formed in a periodic one-dimensional shape, it is not necessarily the case that this one-dimensional shape of the concave-convex structure must have a periodic formation.

Figure 4:
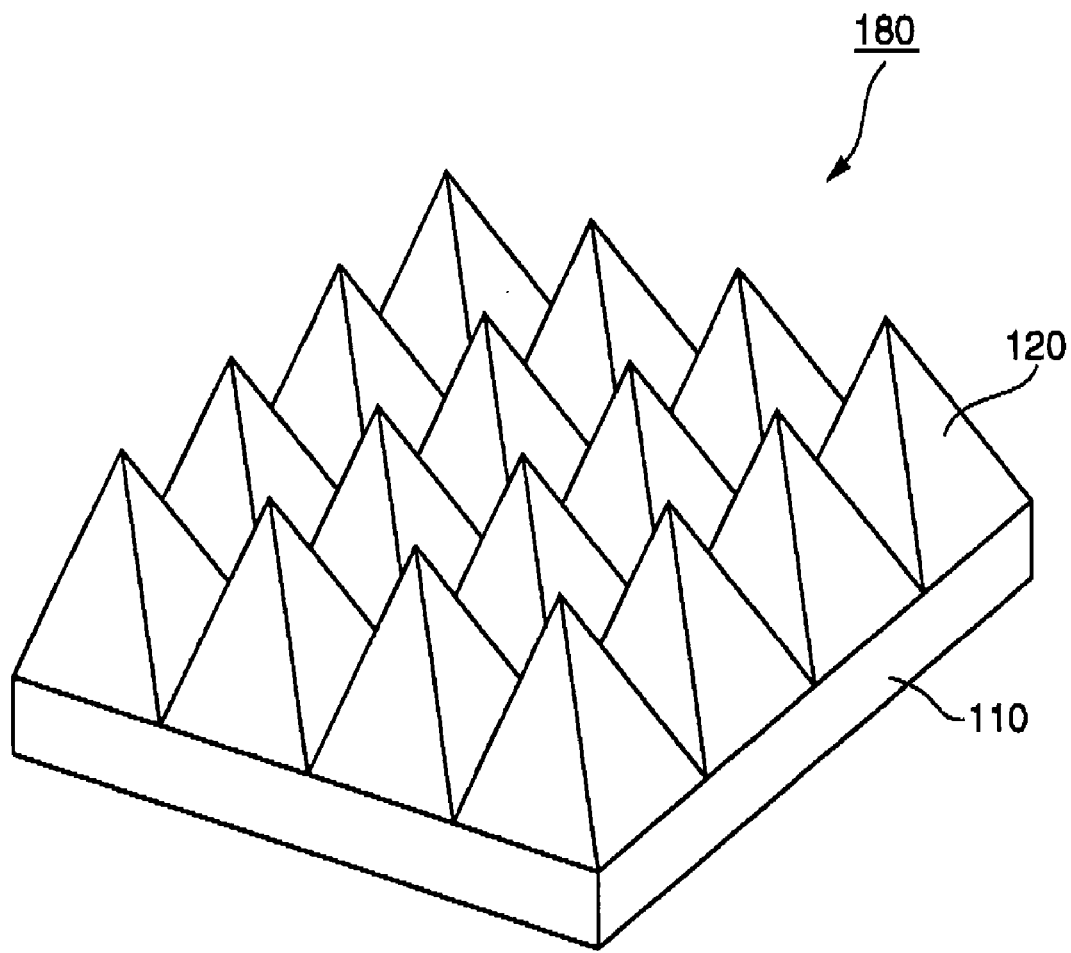
FIG. 4 is a perspective view of another embodiment of the shape of the finestructure pertaining to the present invention.

FIG. 4 is a schematic perspective view of the finestructure of the shape of another embodiment according to the present invention. Although the shape of the finestructure 120 illustrated in FIG. 4 is formed in a periodic two-dimensional shape, in the same way as the description of FIG. 3, it is not necessarily the case that this two-dimensional shape of the concave-convex structure must have a periodic formation.

Furthermore, the object of the present invention can be achieved with the finestructure according to the present invention of a shape that combines both the one-dimensional concave-convex shape shown in FIG. 3 and the two-dimensional concave-convex shape shown in FIG. 4.

It should be noted that the term "one-dimensional" used herein refers to a dimension in which the shape of the concave-convex structure on the surface changes in one direction, on the other hand, the term "two-dimensional" used herein refers to a dimension in which the shape of the concave-convex structure on the surface changes in two directions.

By the formation of the ITO film 130 on the concave-convex structure by a method of sputtering or electron beam vacuum deposition or the like, the ITO film 130 itself is formed in a shape that is similar to the shape of the concave-convex structure. Accordingly, as described below, an improvement in light transmittance can be achieved based on the antireflection of light. It should be noted that, in view of the fact that the transparency of the film 130 itself should be high, it is preferable for the transparent electrode film 130 to be formed in a film thickness of the order of 10 to 50 nm.

Figure 5:
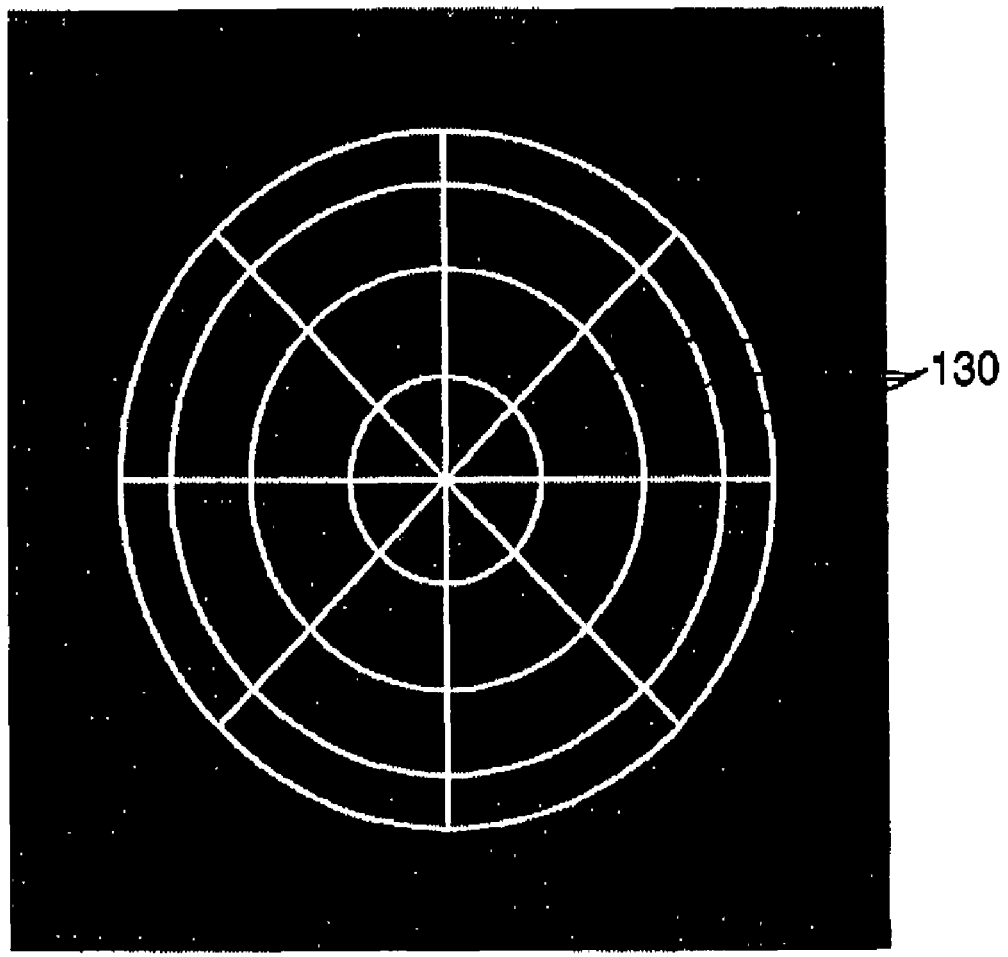
FIG. 5 is a schematic view of one embodiment of the pixel-partitioned transparent electrodes used in the present invention.

FIG. 5 is a schematic view of one embodiment of the pixel-partitioned transparent electrode film used in the present invention. As is shown in FIG. 5, the transparent electrode, which describes a concentric circle shape and is radially partitioned, is able to produce voltage distribution for applying to the liquid crystal based on the application of voltage of a different level for each partitioned electrode film. It should be noted that the black section of the FIG. 5 indicates the ITO film 130.

Incidentally, when mediums of different refractive indices are laminated through interfaces, reflection of light occurs at the interfaces because of the rapid change in the refractive index at these interfaces. On the other hand, the lamination of mediums of two types of different refractive indices through the interfaces with a concave-convex shape has the effect of effectively changing the refractive indices continuously at the transition region thereof. However, the phenomenon of gradual and continuous change of a refractive index can occur when the period of the concave-convex structure is small by comparison with the light wavelength. Utilizing this phenomenon, the antireflection effect according to the present invention can be provided by way of the antireflective body.

In particular, based on the later-described simulation results, although the pitch of the concave and convex on the surface of the finestructure 120 according to the present invention (see pitch width of FIG. 2) is dependent on the relationship between the refractive indices of the ITO film or the alignment film and the light wavelength, in a case where the concave-convex structure has a periodically changing structure, it is preferable that the pitch is no more than 500 nm and, more preferably, that it is no more than 350 nm and, more preferably, that it is no more than 250 nm.

Although there are no restrictions to the material of the finestructure according to the present invention, from the viewpoint of light transmittance it is preferable that the material be a glass or a transparent resin.

Although a description is given next of a typical method for manufacturing the antireflective body 110 comprising the substrate 110 and the finestructure 120, there are no particular restrictions to the method for manufacturing the antireflective body 180 according to the present invention.

Figure 6:
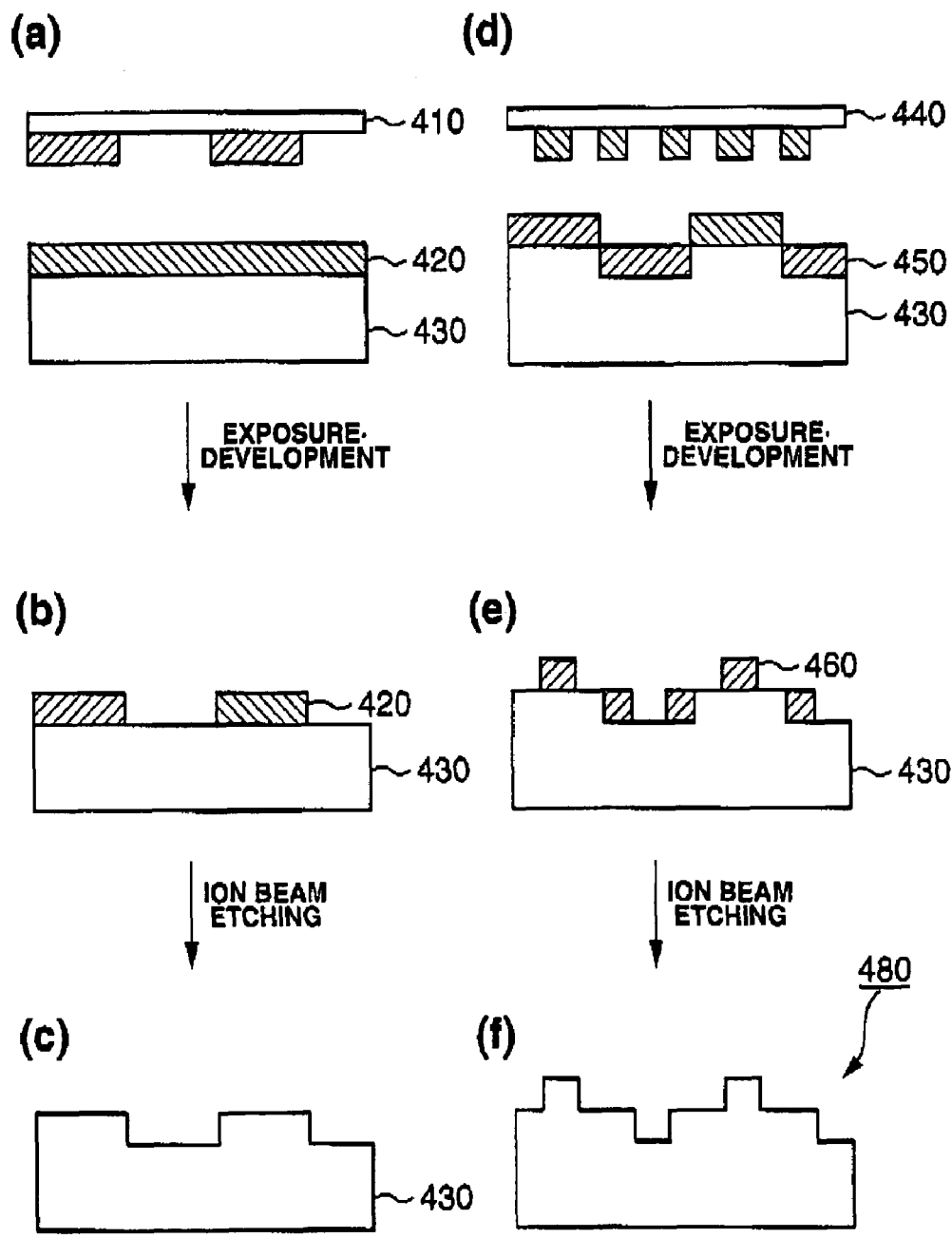
FIG. 6 is a cross-sectional diagram of the steps for explaining one method for manufacturing an antireflective body according to the present invention.

FIG. 6 is a cross-sectional view of the steps for explaining one method for manufacturing the antireflective body comprising the finestructure according to the present invention. The manufacturing method illustrated in FIG. 6 constitutes a method for manufacturing a finestructure based on the repetition of a lithography process.

More specifically, as shown in FIG. 6(a), a resist film 420 is pre-coated on a glass substrate 430 in advance and is exposed to light through a mask 410 having a first predetermined pattern produced in advance and is developed to form a pattern on the glass substrate corresponding to the first predetermined pattern (see FIG. 6(b)). Thereafter, as illustrated in FIG. 6(c), a first pattern is formed on the glass substrate by the etching of the glass using an ion beam. Next, a resist 450 is formed on the entire surface of the glass substrate (see FIG. 6(d)). As shown in FIG. 6(e), a resist pattern 460 is formed on the glass substrate 430 by exposure and development by way of a mask 440 having a second pattern different from the first pattern. Next, the glass substrate is etched using an ion beam. By the repetition of the process described above for the number of times based on need, as shown in FIG. 6(f), an antireflective body 480 with a finestructure comprising the concave-convex structure on its surface can be manufactured.

FIG. 7 is a cross-sectional view of the steps for explaining another method for manufacturing an antireflective body comprising the finestructure according to the present invention. The manufacturing method shown in FIG. 7 constitutes a method that combines the use of a low γ resist and the control of the dose amount based on electron beam drawing.

More specifically, as shown in FIG. 7(a), a low γ resist 510 is formed on a glass substrate 500. Then, the drawing of electron beam having a controlled dose amount occurs in sequence from one end on the resist (see FIG. 7(b) to FIG. 7(e)). It should be noted that the arrows in FIGS. 7(b) and 7(c) indicate the irradiation of the controlled dose amount of electron beam. Thereafter development occurs forming a resist film of a predetermined pattern on the glass substrate (see FIG. 7(f)). As shown in FIG. 7(g), the antireflective body 580 comprising a finestructure with a concave-convex structure on the surface can be manufactured by subsequent etching.

The antireflective bodies 480, 500 of the integrated substrate and finestructure can be manufactured using the manufacturing methods explained with reference to FIG. 6 and FIG. 7, Furthermore, by attaching a plate-shaped body comprising a resin to the lower part of the finestructure manufactured by the manufacturing methods depicted in FIG. 6 and FIG. 7, an antireflective body of which the substrate comprising the resin and in which the finestructure comprising the glass can be manufactured.

Figure 8:
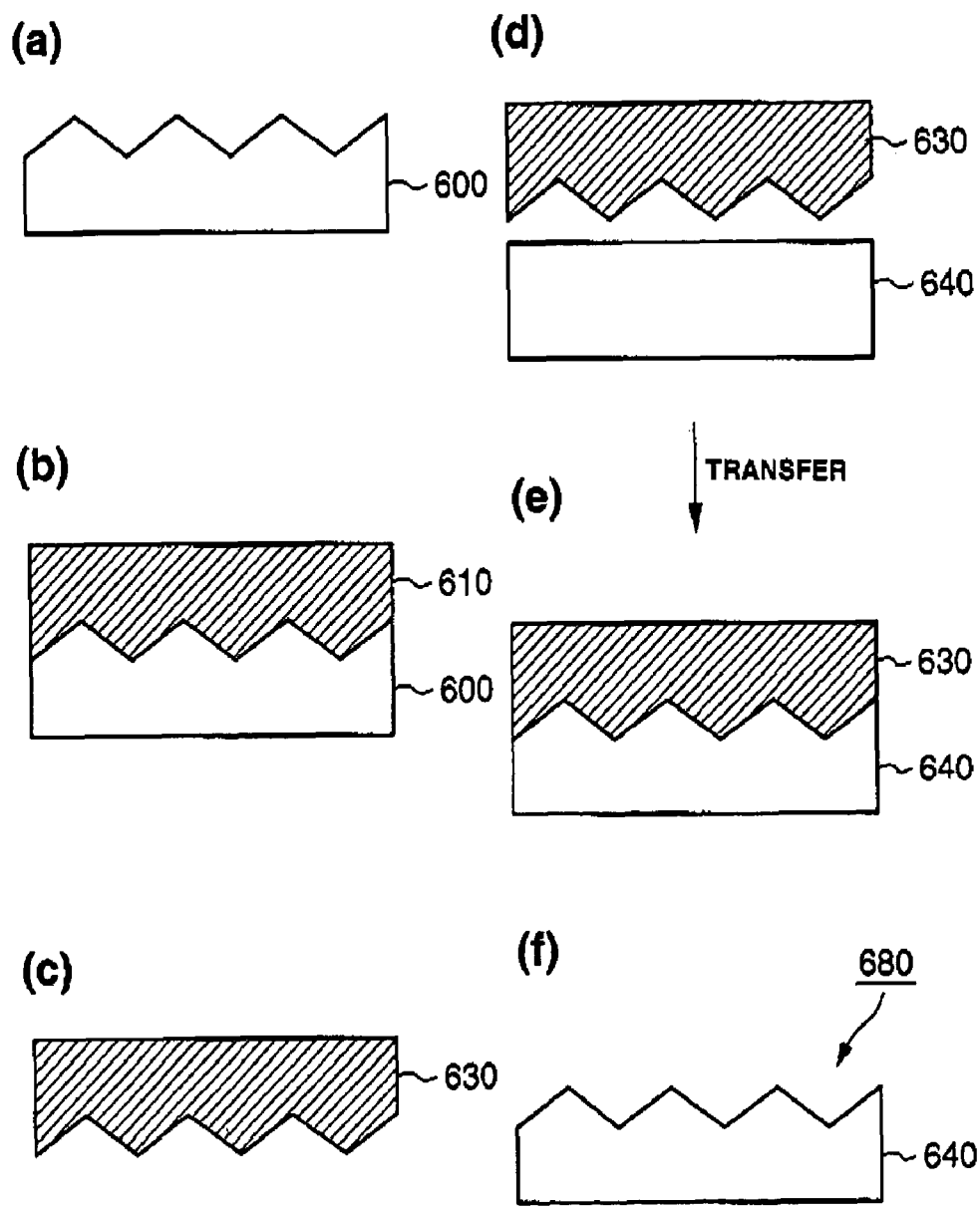
FIG. 8 is a cross-sectional diagram of the steps for explaining a further method for manufacturing the antireflective body according to the present invention.

FIG. 8 is a cross-sectional view of the steps for the explaining a further method for manufacturing an antireflective body comprising the finestructure according to the present invention. The manufacturing method illustrated in FIG. 8 constitutes a method based on use of a stamper comprising a prescribed concave-convex shaped structure on its surface produced by electroforming, that is, a transfer of a shape of the stamper to the resin.

More specifically, as shown in FIG. 8(a), a mould 600 produced by carrying out a conductive processing on a substrate surface comprising a fine pattern is electroformed with nickel (see reference symbol 610 of FIG. 8(b)), whereupon the mould 600 is separated or dissolved from the substrate producing a stamper 630 with a concave-convex shaped surface (see FIG. 8(c)). As shown in FIG. 8(d), by pressing the stamper 630 onto a transparent resin 640, the surface shape of the stamper 630 is transferred to the transparent resin 640 to manufacture an antireflective body 680 comprising a concave-convex structure on its surface. It should be noted that, in the implementation of transfer using the stamper, the ease and speed of this transfer is promoted by heating the resin.

An antireflective body comprising a glass substrate and resin can be manufactured by attaching the glass substrate to the lower part of the resin 640 transferred in this way.

The finestructure according to the present invention can be manufactured by the abovementioned manufacturing methods, and the shape and size of the concave-convex structure of the surface of the finestructure or, more specifically, the pitch of this concave-convex structure, can be manufactured in any size, as required, by the control of the mask pattern and electron beam spot diameter and, furthermore, by the control of the precision of the stamper. More specifically, from the viewpoint of antireflection, it is preferable that the pitch of the periodic structure of the concave-convex structure of the surface of the finestructure according to the present invention be smaller than the light wavelength utilized for information reading of the recording medium as described above.

Figure 9:
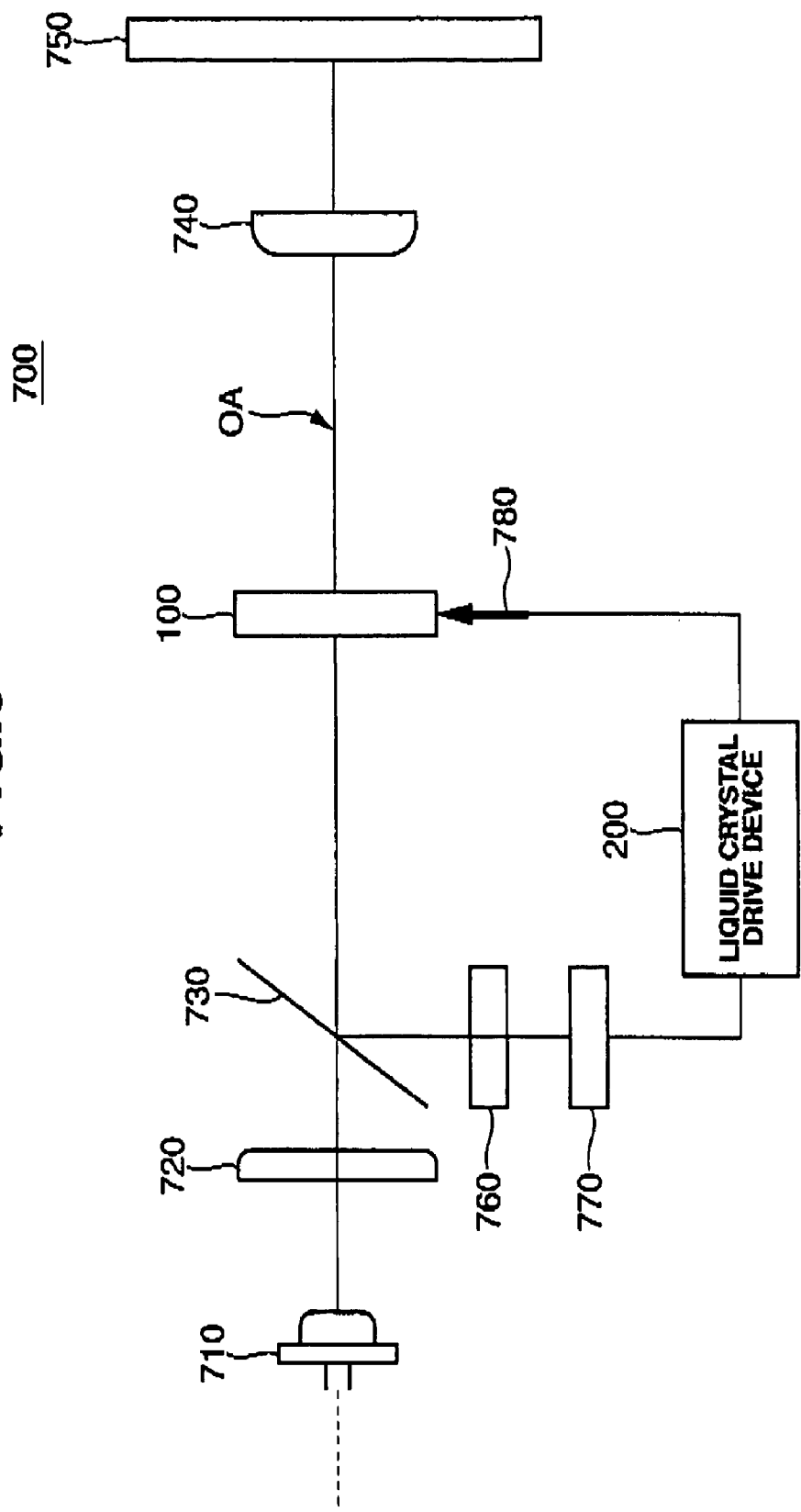
FIG. 9 is a schematic diagram for explaining the constitution of one embodiment of the optical pickup device comprising the wavefront aberration correcting device according to the present invention.

FIG. 9 is a schematic explanatory diagram of the constitution of one embodiment of the optical system of an optical pickup device 700 comprising the wavefront aberration correcting device 100 according to the present invention. A collimator lens 720, a beam splitter 730 and the wavefront aberration correcting device 100 according to the present invention able to be controlled by the liquid crystal driver 200 are provided in sequence along an optical axis OA in an optical path between a laser light source 710, that serves as the light source 710, and an objective lens 740.

It should be noted that the laser light source of the present invention utilizes a blue laser of wavelength of the order of 400 nm from a near infrared region laser of wavelength 780 nm or red laser of wavelength 650 nm. In particular, by combining a blue laser which has lower light-emitting efficiency than a red laser, the wavefront aberration correcting device according to the present invention is able to maximize its light utilization efficiency thereof.

The optical beam irradiated from the laser light source 710 of the optical pickup device 700 is led to the objective lens 740 through the collimator lens 720, the beam splitter 730 and wavefront aberration correcting device 100. The light beam is converged by the objective lens 740 and focused on the information recording surface of the optical disc 750.

The optical beam emitted from the light source 710 is reflected by the optical disc 750 and the return path optical beam reflected by disc 750 is divided by the beam splitter 730, the divided beam is converged by a converging lens 760 and imaged on and detected by the light detector 770. When wavefront aberration is generated as a result of either the tilting of the substrate of the optical disc 750 or a change in the thickness of the optical disc 750, the light detector 770 sends wavefront aberration correcting signals 780 from the liquid crystal driver 200 to the wavefront aberration correcting device 100 and, by controlling the orientation state of the liquid crystal molecules of the wavefront aberration correcting device 100, aberration correction is successively implemented.

EMBODIMENT

The description given below illustrates simulation results of the light reflectance characteristics of the liquid crystal device comprising the antireflective body comprising the finestructure according to the present invention. However, the technical scope of the present invention is in no way restricted to the simulation results outlined below.

There are no particular restrictions to the liquid crystal device comprising the antireflective body according to the present invention employed in the simulations outlined below which comprises, in order, a substrate (Corning #1737, ultraviolet cured methacrylic resin manufactured by Mitsubishi Chemical (Corp.): refractive index 1.52), ITO layer (refractive index 2.0, film thickness 30 nm), alignment film (refractive index 1.75, film thickness 30 nm), and liquid crystal layer (Ne=1.85). The antireflective body according to the present invention refers to a material comprising a substrate and a finestructure constituted in such a way that a concave-convex structure formed on the substrate forms the surface thereof.

In the calculation conditions for these simulations the pitch of the periodic concave-convex structure of the substrate surface was taken as between 10 to 350 nm, and the depth of the periodic concave-convex structure was taken as 0.75 times the abovementioned pitch. Here, the pitch of the periodic concave-convex structure refers to the pitch illustrated in FIG. 2, and the depth of the periodic concave-convex structure refers to the distance between the apex part of the projecting part and the base part of the recess part thereof. In addition, the simulations were implemented on the presumption that light of wavelength 400 nm was used.

Figure 10:
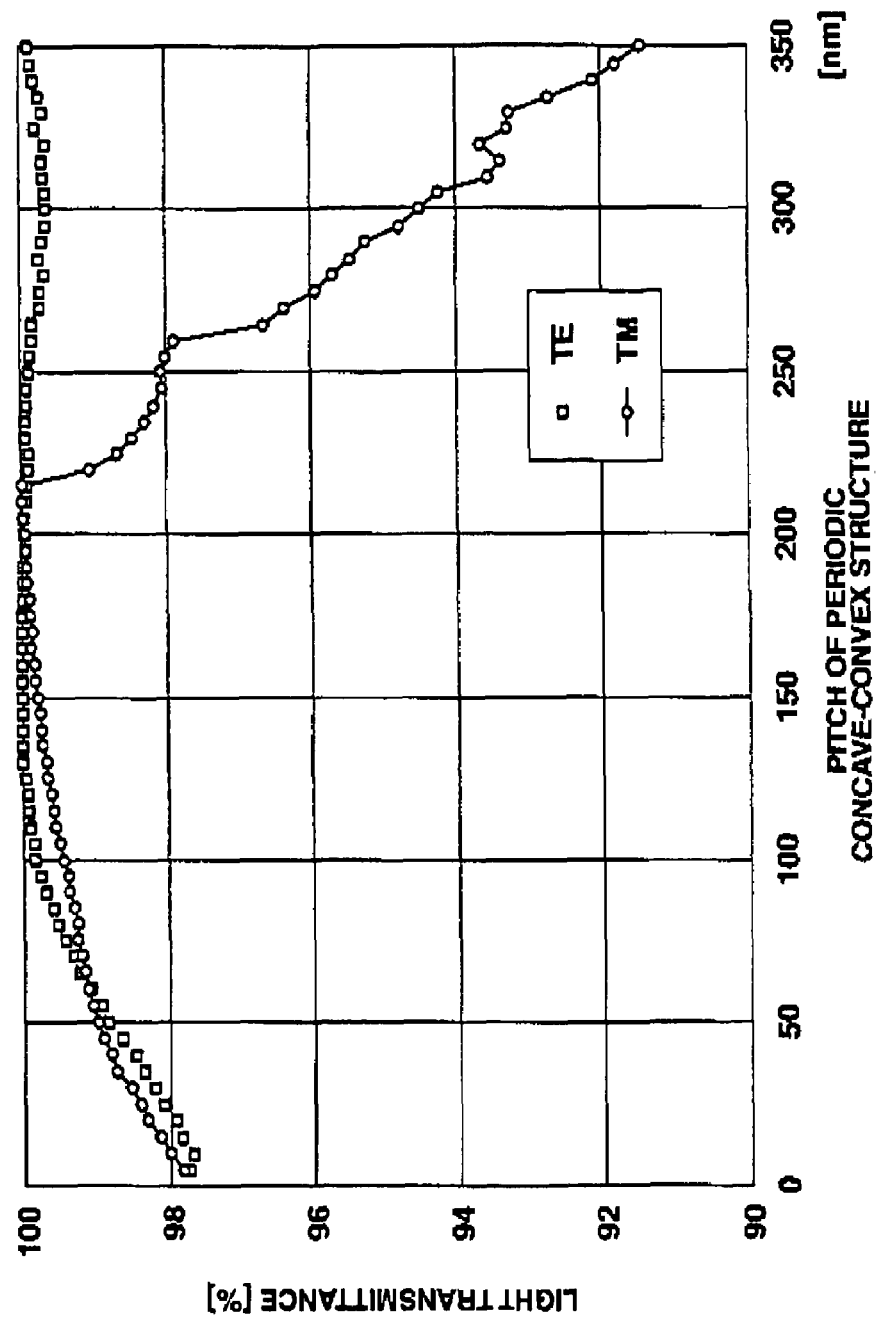
FIG. 10 is a diagram illustrating the light transmittance simulation results of a liquid crystal device comprising the antireflective body with a finestructure according to the present invention, in which with the finestructure surface of a periodic concave-convex structure, the pitch of the periodic concave-convex structure was changed. It should be noted that this simulation was implemented using a light of wavelength 400 nm.

FIG. 10 is a diagram showing the light transmittance simulation results of the liquid crystal device comprising the antireflective body according to the present invention in which the pitch of the periodic concave-convex structure was changed. Here, TE is an abbreviation for transverse electronics and TM is an abbreviation for the transverse magnetics that represent the polarized state of incident light. As seen in the results shown in FIG. 10, the value of TM begins to decrease at a pitch of greater than 220 nm and the light transmittance at pitch of 350 nm was approximately 10% less than the light transmittance at pitch of 200 nm. The decrease in light transmittance in the region of the periodic concave-convex structure of pitch of greater than 250 nm was observed, which is caused by diffraction phenomena.

Figure 11:
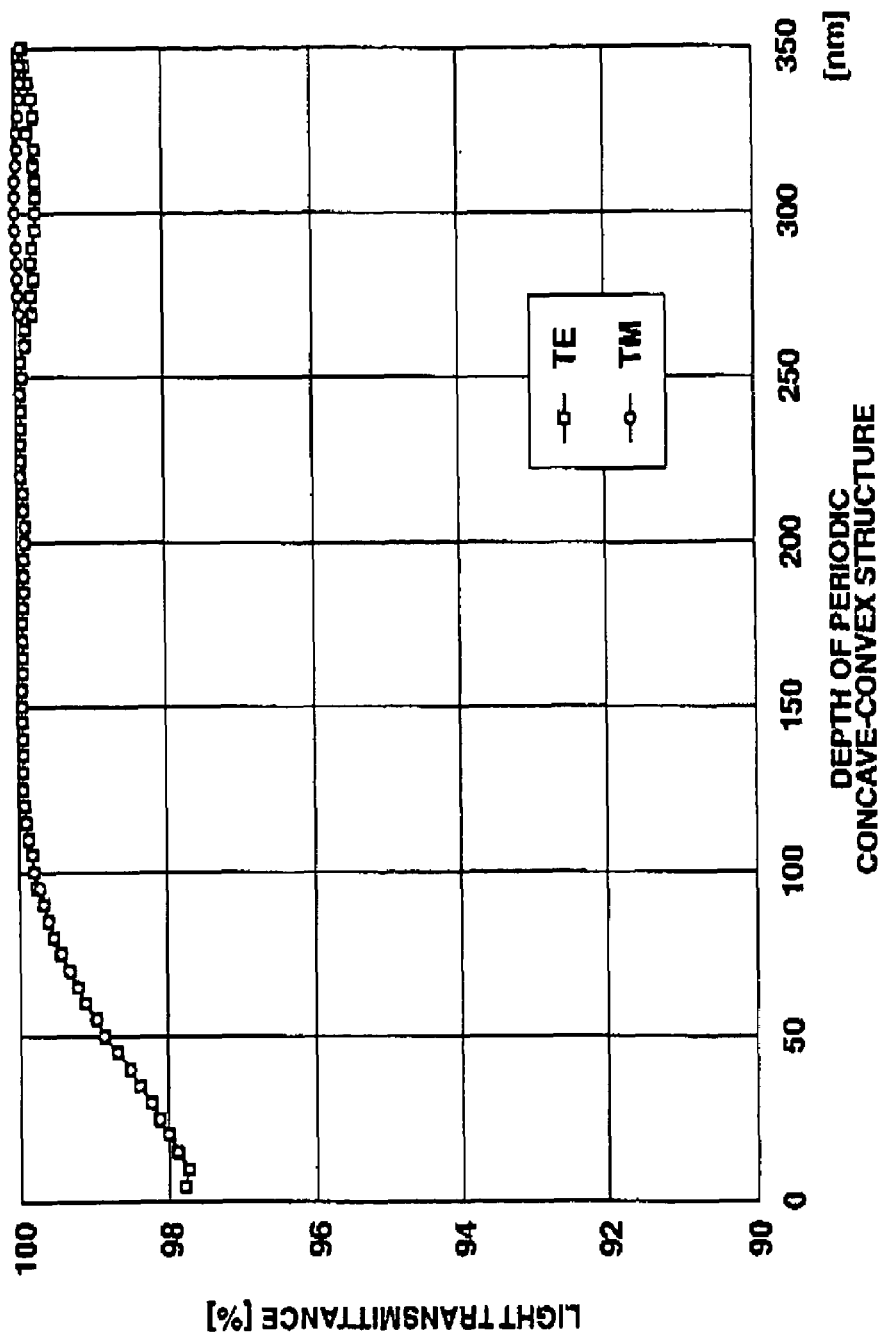
FIG. 11 is a diagram illustrating the light transmittance simulation results of a liquid crystal device comprising the antireflective body with a finestructure according to the present invention, in which with the finestructure surface of a periodic concave-convex structure, the depth of the periodic concave-convex structure was changed. It should be noted that this simulation was implemented using a light of wavelength 400 nm.

Next, taking the pitch of the periodic concave-convex structure as 200 nm and, except for the changing of the depth of the periodic concave-convex structure between 5 to 300 nm, simulation was implemented under the conditions identical to that described above. FIG. 11 is a diagram that illustrates the light transmittance simulation results of a liquid crystal device comprising the antireflective body according to the present invention in which the depth of the periodic concave-convex structure was changed. As is clear from the results of FIG. 11, using a liquid crystal device that utilizes the antireflective body according to the present invention, simulation results in which there was little change in light transmittance at the periodic concave-convex structure depth of 100 nm or more of the surface of the finestructure from which the antireflective body is formed and in which the light transmittance was essentially fixed were obtained.

Figure 12:
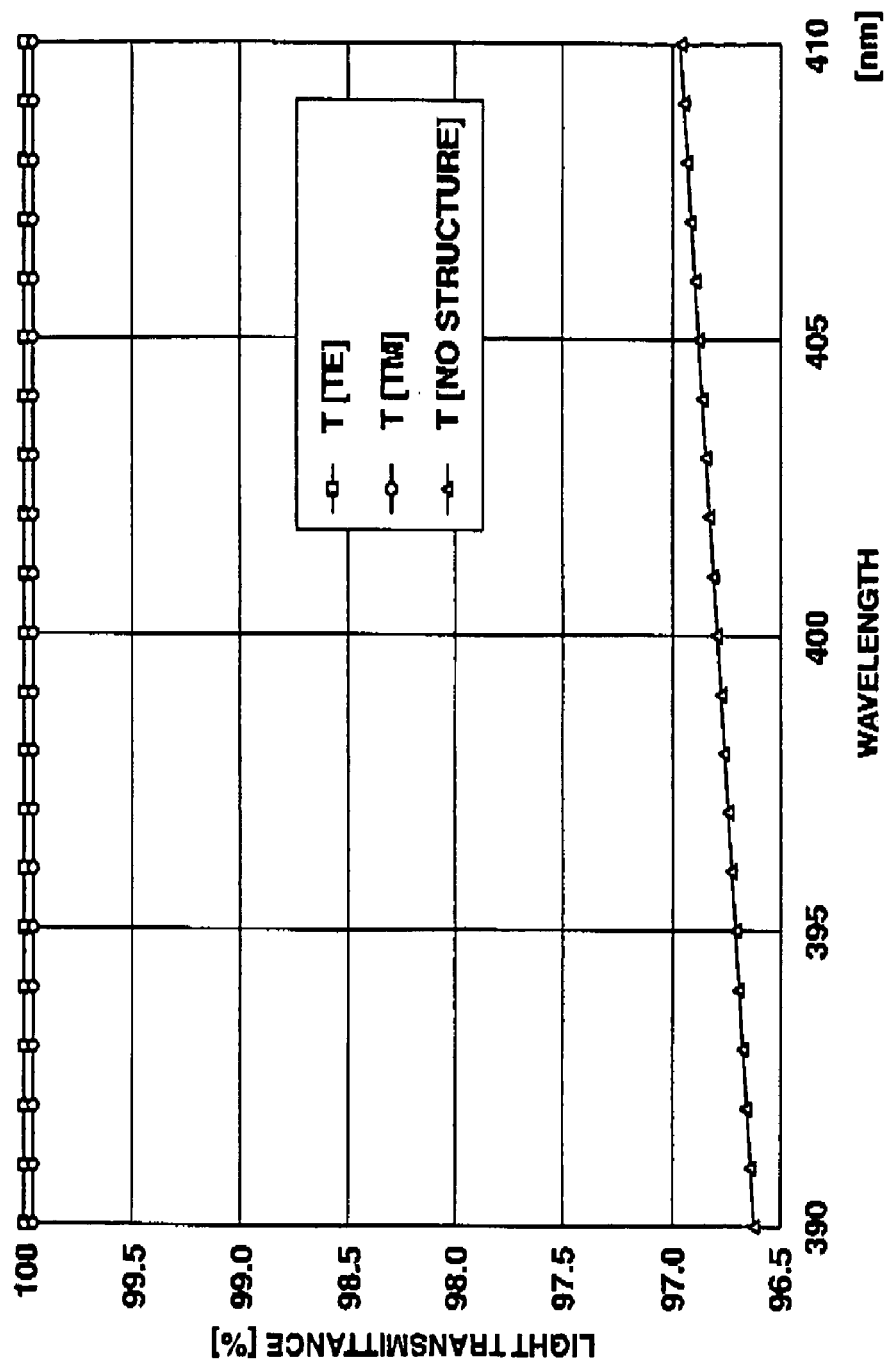
FIG. 12 is a diagram showing the light transmittance wavelength dependency simulation results in a comparison between the liquid crystal device comprising the antireflective body according to the present invention and a liquid crystal device not comprising the antireflective body.

FIG. 12 is a diagram that illustrates the light transmittance simulation results of wavelength dependency in a comparison between the liquid crystal device comprising the antireflective body according to the present invention and a liquid crystal device that does not comprise the antireflective body. It should be noted that the pitch of the periodic concave-convex structure of the surface of the antireflective body was set as 200 nm and the depth thereof was set as 150 nm and, except for the pitch and the depth, the simulation conditions adopted were identical to those of the simulation as shown in FIG. 10. In addition, in view of the fact that the emission wavelength of semiconductor lasers utilized for optical discs and the like fluctuates in accordance with the environmental temperatures during operation, the simulation for the examination of wavelength dependency was implemented using a blue semiconductor laser at an approximate wavelength having a few nanometer range centered in 400 nm. Furthermore, the "no structure" of FIG. 12 refers to light transmittance simulation results for a liquid crystal device not comprising an antireflective body having a periodic concave-convex structure on its surface.

As is clear from the results of FIG. 12, using the liquid crystal device comprising the antireflective body according to the present invention, simulation results of high light transmittance were obtained in the region of the emission wavelength of a blue semiconductor laser during normal operation in a polarized state of TE and TM light. With the "no structure" of FIG. 12, the light transmittance simulation results for TE and TM were indistinguishable due to the perpendicular reflection of light.

Figure 13:
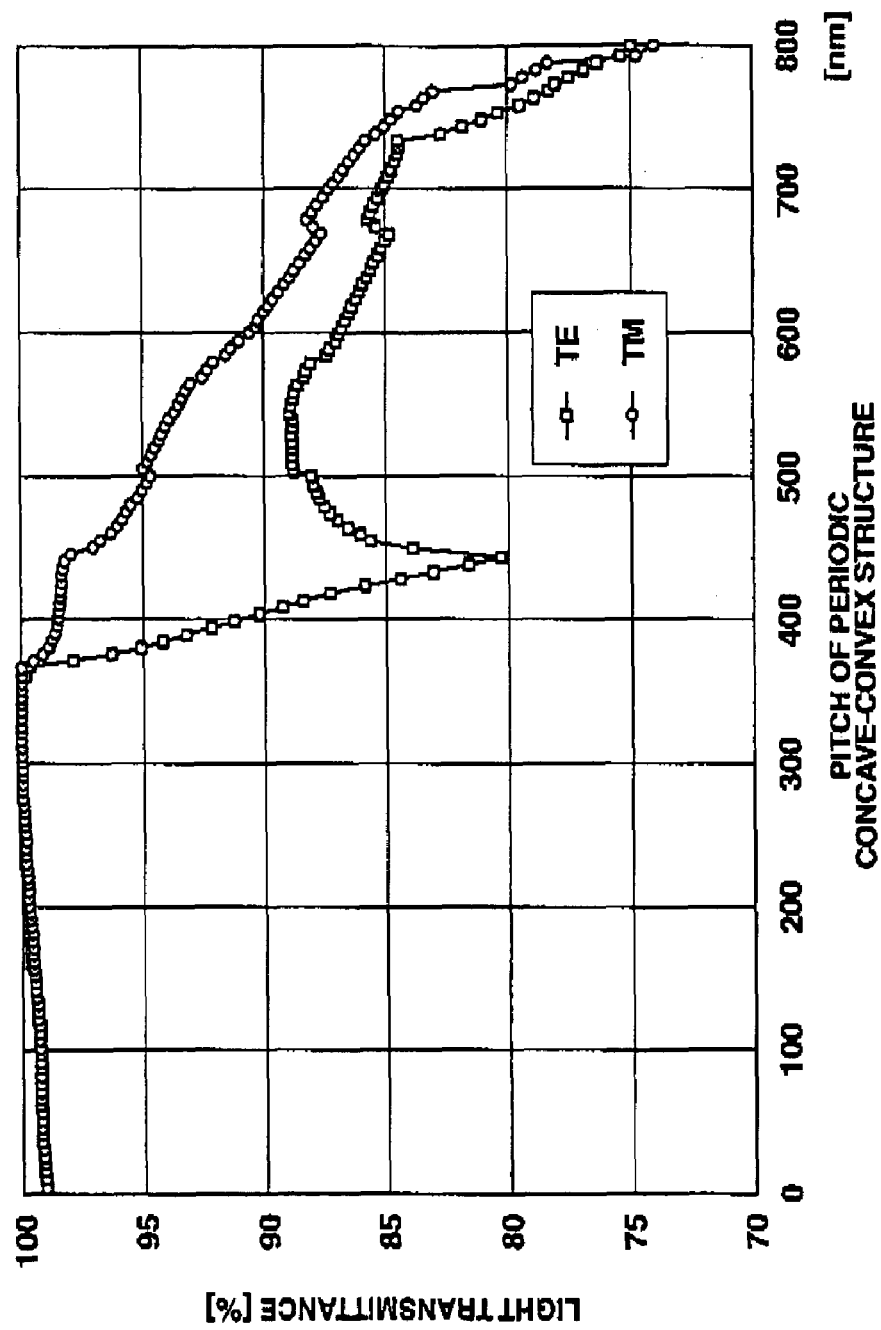
FIG. 13 is a diagram illustrating the light transmittance simulation results of a liquid crystal device comprising the antireflective body according to the present invention, in which with an antireflective body surface of a periodic concave-convex structure, the pitch of the periodic concave-convex structure was changed. It should be noted that this simulation was implemented using a light of wavelength 650 nm.

Next, using light of wavelength 650 nm that is employed in optical discs such as CD or CD-R, simulation of the light transmittance of the liquid crystal device comprising the antireflective body according to the present invention was implemented with respect to the pitch of the antireflective body, and the results thereof are shown in FIG. 13. It should be noted that, in the simulation conditions shown in FIG. 13, the pitch of the periodic concave-convex structure of the surface of the antireflective body was taken as between 5 to 800 nm, and the depth of the periodic concave-convex structure was taken as 0.75 times the abovementioned pitch.

FIG. 14 shows the simulation results in which, under the conditions identical to the simulation conditions shown in FIG. 13, light of wavelength 780 nm was used.

It is clear from the results shown in FIG. 13 that high light transmittance for both TE and TM were obtained at pitch of no greater than approximately 370 nm. In addition, it is clear from the results shown in FIG. 14 that high light transmittance for both TE and TM were obtained at pitch of no greater than approximately 500 nm.

It is apparent from a comparison of the results shown in FIG. 10 with the results shown in FIG. 13 and FIG. 14 that the pitch of the periodic concave-convex structure for obtaining high light transmittance are dependent on the wavelength of the light utilized. Because the light transmittance of the liquid crystal device changes in accordance with the refractive indices of the substrate, the transparent electrodes, the alignment film and the liquid crystal, the pitch of at least the periodic concave-convex structure of the antireflective body surface must be no greater than 500 nm, in order to achieve high light transmittance using the liquid crystal device comprising the antireflective body according to the present invention.

A liquid crystal device produced by two ITO films, which constitute transparent electrodes, arranged on the antireflective body according to the present invention and the sandwiching of a liquid crystal layer (Ne=1.85) there-between was assumed, and a light transmittance simulation of the device with respect to a later-described applied voltage was implemented.

The simulation outlined below was implemented under the conditions in which the pitch of periodic concave-convex structure of the antireflective body according to the present invention was taken as 200 nm and the depth thereof was taken as 150 nm.

FIG. 15 is a diagram that illustrates the light transmittance simulation results (TM) of the liquid crystal device where the phase difference of the liquid crystal layer was changed due to an applied voltage. It should be noted that the liquid crystal phase differences of FIG. 15 and the later-described FIG. 16 refer to phase changes generated due to changes in the refractive index of the liquid crystal layer produced by the applied voltage.

It is clear from the simulation results of FIG. 15 that, even if the refractive index of the liquid crystal layer within the liquid crystal device is changed by the applied voltage, the light transmittance fluctuation rate of the device in the TM polarized state is no more than 0.1%.

FIG. 16 is a diagram that illustrates the light transmittance simulation results (TE) of the liquid crystal device as a whole where the phase difference of the liquid crystal layer is changed by an applied voltage. As is clear from the simulation results shown in FIG. 16, the light transmittance fluctuation rate is no greater than 0.01% even when the applied voltage is changed.

The above simulation results indicate that light transmittance fluctuation with respect to applied voltage is small in a wavefront aberration correcting device in which a structure in which the antireflective body according to the present invention is arranged on the transparent electrodes is adopted. This is because, based on the fact that the reflectance of the ITO film that constitutes a transparent electrode that plays the role of a mirror of a resonator structure which is a cause of light transmittance fluctuations can be reduced, the function of the resonator is impaired.

A structure comprising the sandwiching of the liquid crystal between ITO films can be utilized even in liquid crystal display devices. Accordingly, the wavefront aberration correcting device according to the present invention is not confined to application as a laser wavefront control device and can have application in liquid crystal devices or, more particularly, in reflection-type color liquid crystal display devices. In addition, because of the elimination of the characteristics as a resonator as described above and, as a natural outcome, because of the reduction in transmittance fluctuations depending on the wavelengths, a display device for which the setting of color balance is simple, and which displays good color reproductivity, can be provided.

INDUSTRIAL APPLICABILITY

According to the present invention, in a wavefront aberration correcting device comprising a liquid crystal device comprising a liquid crystal molecule sandwiched between two substrates, because the light reflection within the abovementioned device can be efficiently prevented by the provision of an antireflective body with a finestructure on the abovementioned substrate and the arrangement of transparent electrodes on the antireflective body, an improvement in the light transmittance of the wavefront aberration correcting device as a whole is achieved. In addition, light transmittance fluctuations of the wavefront aberration correcting device accompanying wavefront aberration correction can be suppressed to a minimum. In addition, not only is the wavefront aberration correcting device comprising the antireflective body according to the present invention able to correct aberration that has its origins in the change in the substrate thickness and tilting of an optical disc, it is also correct aberration in the optical system itself such as in the converging lens.

Furthermore, in optical pick up devices comprising the wavefront aberration correcting device according to the present invention, because the light transmittance of the abovementioned wavefront aberration correcting device is high particularly when assembled together with a blue semiconductor laser for emitting light of a short wavelength, an optical pickup device of high light utilization efficiency can be provided,

We claim:

1. A wavefront aberration correcting device for correcting a wavefront aberration of light generated in an optical path of an optical system for irradiating light onto a recording medium or guiding reflected light reflected by the recording medium, the device comprising:
a pair of opposing transparent electrode layers provided in the optical path; and a liquid crystal sandwiched between the transparent electrode layers, the liquid crystal generating phase change in passing light due to voltage applied to the transparent electrode layers,
wherein at least one of the transparent layers is arranged on an antireflective body comprising a substrate, and a finestructure which is formed on the substrate and which has a concave-convex structure.

2. The wavefront aberration correcting device according to claim 1, wherein the concave-convex structure is formed in a one-dimensional and/or a two-dimensional shape.

3. The wavefront aberration correcting device according to claim 1 or 2, wherein when the concave-convex structure has a periodically changing structure, a pitch of the concave-convex structure is no more than 500 nm.

4. The wavefront aberration correcting device according to claim 1 or 2, wherein the antireflective body comprises the substrate and the finestructure that are both formed from either a glass or a resin, and the substrate and the finestructure are integrally formed.

5. The wavefront aberration correcting device according to claim 1 or 2, wherein the antireflective body comprises the substrate formed from a glass and the finestructure formed from a resin.

6. The wavefront aberration correcting device according to claim 1 or 2, wherein the antireflective body comprises the substrate formed from a resin and the finestructure formed from a glass.

7. The wavefront aberration correcting device according to claim 1 or 2, further comprising an alignment film provided between the transparent electrode layer and the liquid crystal.

8. The wavefront aberration correcting device according to claim 1 or 2, wherein the transparent electrode layer comprises an ITO layer that is an oxide of indium and tin.

9. The wavefront aberration correcting device according to claim 1 or 2, wherein the transparent electrode layer is partitioned into pixels.

10. The wavefront aberration correcting device according to claim 1 or 2, wherein the light is a blue semiconductor laser beam.

11. An optical pickup device comprising a light source that emits light for irradiation onto a recording medium, and an objective lens arranged between the light source and the recording medium, the objective lens converging the light from the light source onto an information recording surface of the recording medium, the optical pickup device comprising:
a wavefront aberration correcting device arranged between the light source and the objective lens, the wavefront aberration correcting device comprising a pair of opposing transparent electrode layers provided in an optical path in the optical pickup device; and a liquid crystal sandwiched between the transparent electrode layers, the liquid crystal generating phase change in passing light due to voltage applied to the transparent electrode layers,
wherein at least one of the transparent electrode layer is arranged on an antireflective body comprising a substrate, and a finestructure which is formed on the substrate and which has a concave-convex structure.

12. The optical pickup device according to claim 11, wherein the concave-convex structure is formed in a one-dimensional and/or a two-dimensional shape.

13. The optical pickup device according to claim 11 or 12, wherein when the concave-convex structure has a periodically changing structure, a pitch of the concave-convex structure is no more than 500 nm.

14. The optical pickup device according to claim 11 or 12, wherein the antireflective body comprises the substrate and the finestructure that are both formed from either a glass or a resin, the substrate and the finestructure are integrally formed.

15. The optical pickup device according to claim 11 or 12, wherein the antireflective body comprise the substrate formed from a glass and the finestructure formed from a resin.

16. The optical pickup device according to claim 11 or 12, wherein the antireflective body comprises the substrate formed from a resin and the finestructure formed from a glass.

17. The optical pickup device according to claim 11 or 12, further comprising an alignment film provided between the transparent electrode layer and the liquid crystal.

18. The optical pickup device according to claim 11 or 12, wherein the transparent electrode layer comprises an ITO layer that is an oxide of indium and tin.

19. The optical pickup device according to claim 11 or 12, wherein the transparent electrode layer is partitioned into pixels.

20. The optical pickup device according to claim 11 or 12, wherein the light is a blue semiconductor laser beam.

* * * * *